United States Patent
Williams

(10) Patent No.: US 6,519,702 B1
(45) Date of Patent: Feb. 11, 2003

(54) METHOD AND APPARATUS FOR LIMITING SECURITY ATTACKS VIA DATA COPIED INTO COMPUTER MEMORY

(75) Inventor: Emrys J. Williams, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/235,880

(22) Filed: Jan. 22, 1999

(51) Int. Cl.[7] .............................................. G06F 13/00
(52) U.S. Cl. ...................................... 713/201; 713/202
(58) Field of Search ................................ 713/200, 201, 713/202

(56) References Cited

U.S. PATENT DOCUMENTS

| | | | | |
|---|---|---|---|---|
| 5,359,659 A | * | 10/1994 | Rosenthal ........................ | 380/4 |
| 5,421,006 A | * | 5/1995 | Jablon et al. ................. | 395/575 |
| 5,572,590 A | * | 11/1996 | Chess ............................ | 380/4 |
| 5,619,571 A | * | 4/1997 | Sandstrom et al. ............. | 380/4 |
| 5,771,292 A | * | 6/1998 | Zunquan ........................ | 380/25 |
| 5,956,481 A | * | 9/1999 | Walsh et al. .................. | 395/186 |

FOREIGN PATENT DOCUMENTS

| EP | 1056 010 A1 | * | 11/2000 | ........... | G06F/11/00 |

OTHER PUBLICATIONS

*System for Detecting Undesired Alteration of Software*, Apr. 1990, IBM Tech Discl, vol. 32, Issue 190 11, pp. 48–50.*

Trojan Horse and Virus Detection using Real Time Anditing, Dec. 1, 1991, IBM Tech Bull. Disc., vol. 34, Issue #7B, pp. 78–81.*

* cited by examiner

*Primary Examiner*—Norman M. Wright
(74) *Attorney, Agent, or Firm*—Park, Vaughan & Fleming LLP

(57) ABSTRACT

A system for limiting security attacks on a computer system that operate by executing computer instructions embedded in data received from an external source. The system receives the data from the external source and performs a transformation on the data that causes any computer instructions encoded in the data to be unexecutable. After the data is transformed, the system stores the data in the computer system's memory. When the data is needed, the system retrieves the data and reverses the transformation. In this way, data from an external source is stored in memory in an unexecutable form, thereby making it impossible to execute malicious code embedded in the data. According to one aspect of the present invention, the data is transformed using a random number, so that the data can only be converted back to its original form with an inverse transformation using the same random number.

37 Claims, 4 Drawing Sheets define write_c_randomized(c, ptr, rand) \
    *ptr=c^(rand>>((ptr&3)*8))

define read_randomized_c(ptr, rand) \
    *ptr^(rand>>((ptr&3)*8))

write_c_randomized(c, ptr, rand);
c=read_randomized_c(ptr, rand);

METHOD AND APPARATUS FOR LIMITING SECURITY ATTACKS VIA DATA COPIED INTO COMPUTER MEMORY

BACKGROUND

1. Field of the Invention

The present invention relates to security in computer systems. More particularly, the present invention relates to a method and apparatus for limiting security attacks on a computer system that cause a computer system to execute computer code embedded in data received from an external source, such data received in the form of an electronic mail message.

2. Related Art

As computers become increasingly inter-linked through computer networks, security problems arise from malicious programs, such as computer viruses, which can enter a computer system through a computer network. These malicious programs often operate by hiding malicious code in a data file, such as an electronic mail message or a web page, which is copied into the memory of a computer system. A malicious program typically exploits some feature of an application executing on the computer system, such as an email program or a web browser application, to cause the malicious code stored in the memory of the computer system to be executed.

For example, a malicious program may pass an overly large array as a parameter into an email function causing the email function to overwrite a return address on the system stack. If the return address is overwritten with the start address of the malicious code stored in memory, the system will return control to the malicious code. Once the malicious code begins executing, computer system security has been compromised.

One solution to this problem is carefully write all applications that handle data from unreliable sources so as not to leave any holes open to security attack. For example, the above-described attack can be prevented by always checking array bounds. However, applications that handle data from external sources, such as web browsers and email programs, are often quite complex and large, making it difficult to write such applications without any weaknesses that can be attacked. Furthermore, unlike operating systems that are typically architected to provide security, applications such as email programs and web browsers are typically not designed to provide a high level of security.

Another way to avoid attacks of this type is to completely separate code and data storage in memory, making it impossible to execute data files. However, existing programs and operating systems are not structured to enforce such separation. Consequently, the existing base of programs and operating systems would have to be completely redesigned to enforce code and data separation, which would be impractical. Furthermore, by completely separating code and data, it is very hard if not impossible to perform many tasks that rely on code and data being interchangeable in memory, such as compilation of code on-the-fly.

Also, note that a similar attack can be carried out by causing a file containing malicious executable code to be stored on a disk in the computer system, and then causing the computer system to execute the file.

What is needed is a method or apparatus that prevents malicious code embedded in data from an external source from being executed by a computer system.

SUMMARY

One embodiment of the present invention provides a system for limiting security attacks on a computer system that operate by causing the computer system to execute computer instructions embedded in data received from an external source. The system operates by receiving the data from the external source and performing a transformation on the data that causes any computer instructions that may be encoded in the data to be unexecutable. After the data is transformed, the system stores the data in a memory in the computer system. When the data is needed, the system retrieves the data from the memory and reverses the transformation. In this way, data from an external source is stored in memory in a form that cannot be executed by the computer system, thereby making it impossible to execute malicious code embedded in the data.

According to one aspect of the present invention, the data is transformed using a random number, so that the data can only be converted back to its original form with an inverse transformation using the same random number.

According to one aspect of the present invention, the transformed data is additionally stored to a secondary storage device, such as a disk drive, in the computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may originate from a communications network, such as the Internet.

Transformation Process

Figure 1:
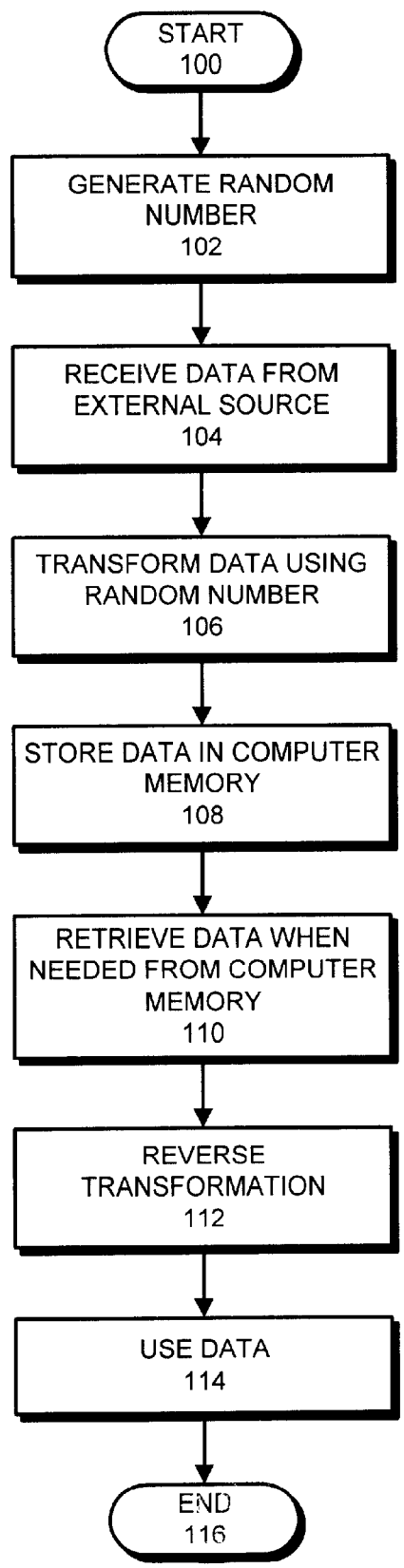
FIG. 1 is a flow chart illustrating the process of transforming data prior to storing it in a memory of a computer system in accordance with an embodiment of the present invention.

FIG. 1 is a flow chart illustrating the process of transforming data prior to storing it in a memory of a computer system in accordance with an embodiment of the present invention. The system first generates a random number (step 102). This random number may be generated upon system startup using random number generation functions that are provided by most programming languages. Alternatively, the random number may be gathered by asking a computer user to enter the random number manually. In general, any method of generating or procuring the random number may be used so long as a potential attacker does not have access to the random number.

The system next receives data from an external source that cannot be completely trusted (step 104). For example, the data may be received as an electronic mail (email) message by an email program executing on a local computer system. In another example, the data may be received in the form of a web page from a remote web site by a web browser application on the local computer system. In yet another example, the data may be received as part of a data file located on a disk that is inserted into the local computer system.

After the data is received, the system transforms the data using the random number (step 106). Many different functions may be used to transform the data using the random number. The only requirements are that (1) the function must be reversible, so that the data can be returned to its original state, and (2) that the function must transform the data so that any computer instructions that may be embedded or encoded in the data become unexecutable. For example, one possible function is to perform a bit-wise exclusive-OR operation between the random number and the input data. This function can be easily reversed by performing the bit-wise exclusive-OR operation on the transformed data to return the transformed data back to its original form.

Using a random number ensures that an adversary cannot know what transformation will be performed ahead of time. Consider the case where the system relies on a transformation function that is completely deterministic. In this case, it may be possible for an adversary to defeat the system by creating data that becomes executable code after the deterministic transformation.

As an alternative to using a random number to perform the transformation, the system can use any function that transforms data so that it cannot be used as executable code. For example, one possible function inserts a special byte pattern between every consecutive three bytes of the data so that every four-byte word in the transformed data contains the special byte pattern. This special byte pattern has the property that it causes any four-byte word containing the special byte pattern to be an illegal instruction.

After the data is transformed, it is stored in a memory in the computer system (step 108). This memory may include semiconductor memory or secondary storage. (Secondary storage includes archival storage devices, such as magnetic and/or optical disk drives as well as tape drives). Since the data is transformed before it is stored in memory, a malicious program or email message cannot cause the computer to execute code embedded in the data when it is stored in memory.

When the data is needed by the computer system at some later point in time, the system retrieves the data from the memory (step 110), and reverses the transformation to restore the data to its original form (step 112). This allows a program to use the data (step 114). Ideally, the data restored to its original form is simply stored in computer system registers, which cannot be executed as instructions. When this is not practical, a small buffer in memory can be used. If such a buffer is used, it is desirable to keep the buffer as small as possible and to ensure that any data in the buffer be as short-lived as possible.

An alternative method for preventing an attack based on executing code embedded in data is to store the data at randomized locations in the memory so that an adversary cannot pinpoint the location of the code in memory. This makes it hard for the adversary to cause the code to be executed.

Note that after the data is used it may have to be stored to memory again, which involves repeating steps 106 and 108.

Functional Entities

Figure 2:
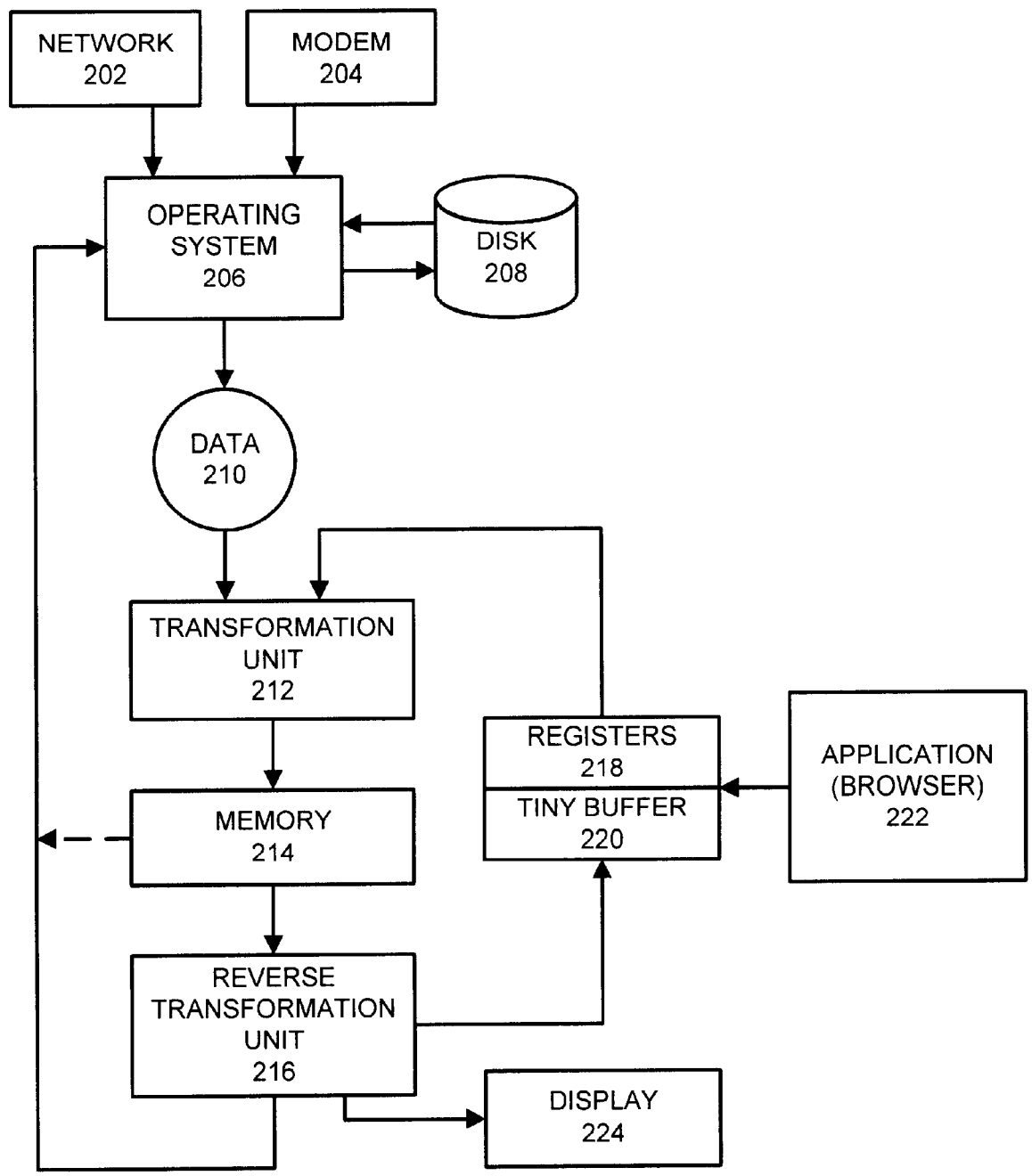
FIG. 2 is a block diagram illustrating the major functional entities involved in the data transformation process in accordance with an embodiment of the present invention.

FIG. 2 is a block diagram illustrating the major functional entities involved in the data transformation process in accordance with an embodiment of the present invention. In this embodiment, data 210 from an external source enters operating system 206. Data 210 may originate from network 202, possibly in the form of an email message or a web page. Network 202 may be any type of network or collection of networks that can be used to couple together computer systems, such as a local area network and/or a wide area network. Data 210 may additionally enter operating system 206 through a modem 204, which receives data 210 from a telephone line. Alternatively, the data 210 may originate from disk 208. Disk 208 may contain data that was originally read from network 202 or modem 204 and then stored on disk 208. Disk 208 may also include a floppy disk containing a data file to be opened by operating system 206. Although the illustrated embodiment receives data from network 202, modem 204 and disk 208, in general data 210 may originate from any source external to the computer system.

Operating system 206 may include any operating system or application program that receives data from an external source. In the case of an operating system, the specific I/O routines that are used to access data from external source can be modified to perform the transformation. In the case of an application, the specific program instructions that access data from external sources can be modified to perform the transformation.

Operating system 206 feeds data 210 through transformation unit 212 into memory 214. In one embodiment of the present invention, transformation unit 212 assumes the form of special-purpose circuitry embedded in the computer system to perform the transformation. In another embodiment, transformation unit 212 assumes the form of computer program instructions, within operating system 206 or within an application, that perform the transformation.

Recall that memory 214 may include semiconductor memory for storing code and data, as well as a secondary storage device containing files of code and data.

When the data is needed by an application at some time in the future, the data is retrieved from memory 214 and is fed through reverse transformation unit 216, which returns the data to its original form. This allows an application 222, such as a web browser of an email program, to operate on the data. In the illustrated embodiment, the data in its original form is stored in registers 218 or in a tiny buffer 220 (which is possibly located in memory 214).

One problem with the illustrated system is that transformed data stored in memory 214 may have to be converted back to its original form for outputting to a display 224 (or possibly to an audio output device for audio data). In order to display the data, it must first be transformed into its original form through reverse transformation unit 216.

In some computer systems, data stored in display memory can be executed by a program. If this is the case, it is desirable to build special-purpose transforming hardware into the display so that data can be stored in display memory in scrambled form. This data in display memory will be unscrambled by the special-purpose hardware prior to outputting to display 224.

When application 222 is finally finished with the data, the data may be stored back into memory 214 by first passing it through transformation unit 212 to convert the data back into scrambled form.

Data may also have to be stored to disk. In one embodiment of the present invention, if data needs to be stored to a file on disk 208, the data is stored in unscrambled form. This is accomplished by passing the data through reverse transformation unit 216, and then through operating system 206 into disk 208.

In another embodiment of the present invention, data is stored on disk 208 in scrambled form. In this case, data passes from memory 214 directly into operating system 206 (dashed line), without passing through reverse transformation unit 216, and then into disk 208. In this embodiment, the data file on disk 208 includes information on how to unscramble the data. For example, the data file may contain a random number, which allows the transformation on data within the data file to be reversed. Recall that the random number must be stored with the data file because the random number used by the computer system ay change.

Note that the above-described transformation process only needs to be applied to "untrusted" data. Data items are untrusted if they cannot be identified originating from a trusted source. Other "trusted" data items, such as local loop counters do not need to be transformed. In one embodiment of the present invention, the transformation process is only applied to "untrusted" data, while other types of data, such as locally defined variables, are not transformed. This avoids unnecessary transformations and may thereby increase system efficiency.

Hardware Implementation

Figure 3:
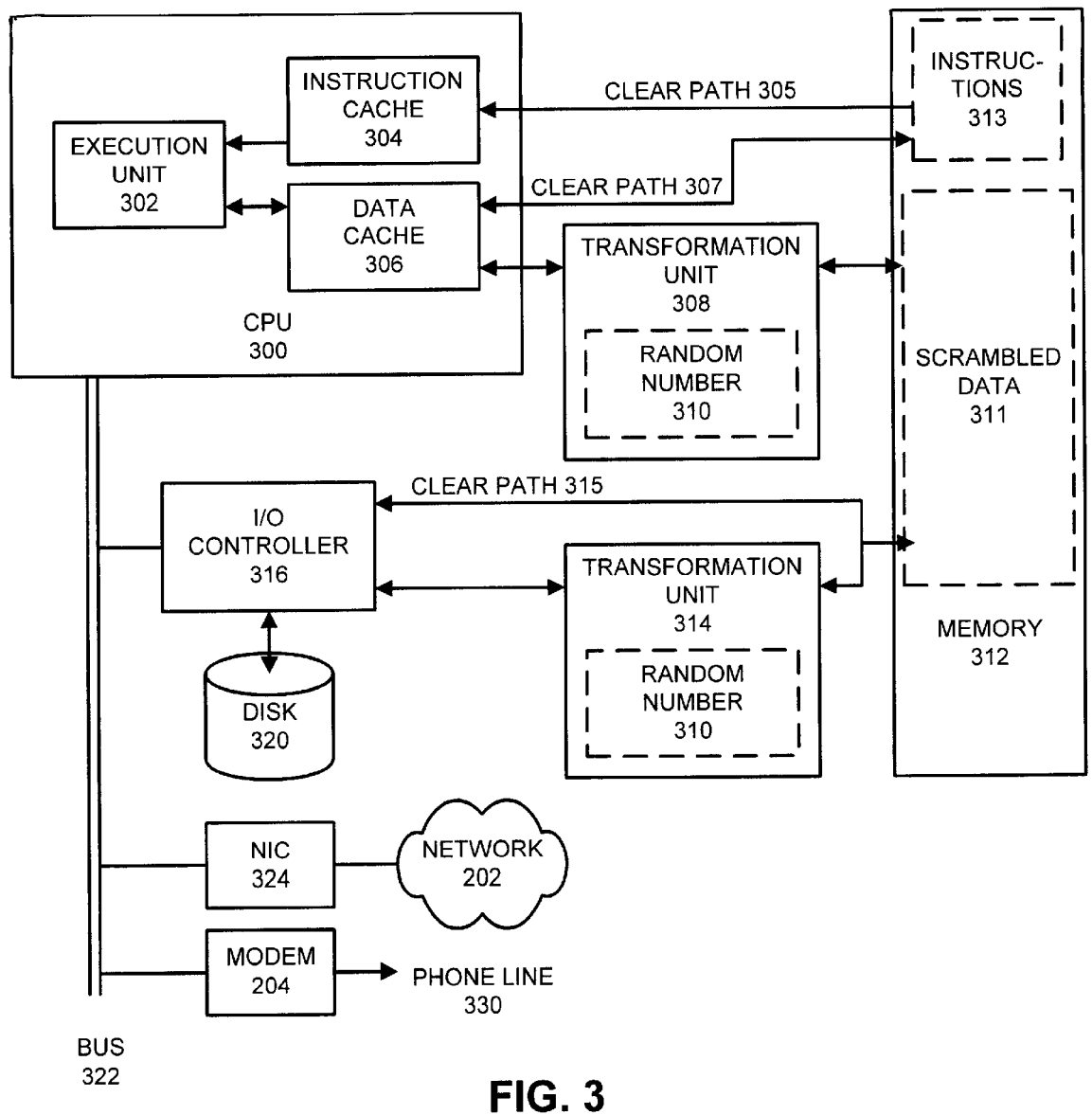
FIG. 3 is a diagram illustrating a hardware implementation of a data transformation mechanism in accordance with an embodiment of the present invention.

FIG. 3 is a diagram illustrating a hardware implementation of the data transformation mechanism in accordance with an embodiment of the present invention. In this embodiment, the transformation process and the reverse transformation process are carried out by special purpose circuitry within transformation units 308 and 314. The computer system in FIG. 3 includes central processing unit (CPU) 300 coupled to memory 312 and bus 322. CPU 300 may include any type of computing device that is capable of processing code and/or data. This includes, but is not limited to, a mainframe processor, a multi processor system, a microprocessor, a device controller, and a computing unit within an appliance. CPU 300 contains instruction cache 304 and data cache 306, which store code and data, respectively, for use by CPU 300. Note that CPU 300 may be coupled to memory 312 in a number of ways, including through a separate processor-to-memory bus, through bus 322 or through a core logic unit.

Memory 313 includes any type of random access memory that can be used to store code and/or data for execution by CPU 300.

Bus 322 couples CPU 300 to 1/0 controller 316, network interface controller (NIC) 324 and modem 204. I/O controller 316 may include any type of controller for I/O devices in the computer system, including a disk controller. Note that I/O controller 316 may have direct memory access (DMA) capability allowing I/O controller 316 to directly access memory 312. I/O controller 316 is coupled to disk 320, which contains files of code and/or data for use by CPU 300. Disk 320 refers to any type of secondary storage device, including a magnetic or optical disk drive or a tape drive. Network interface controller (NIC) 324 includes circuitry for coupling the computer system to a computer network 202. Network 202 may be any type of local area network, wide area network, or collection of networks, such as the Internet. Modem 204 may be any type of circuitry that can be used to couple the computer system to a telephone line 330.

CPU 300 is coupled to memory 312 through both transformation unit 308, clear path 305 and clear path 307. Transformation unit 308 performs transformations and reverse transformations on code and/or data passed between CPU 300 and memory 312. Note that transformation unit 308 includes random number 310, which is generated during system startup and is stored within transformation unit 308. Also note that there is a clear path 305 and a clear path 307 for transferring data between CPU 300 and memory 312 without passing through transformation unit 308. Clear path 305 can be used to transfer code to be executed between memory 312 and instruction cache 304 within CPU 300. The path through transformation unit 308 can be used to transfer data between memory 312 and data cache 306 within CPU 300. Clear path 307 can be used to transfer data and/or instructions between data cache 306 and memory 312 without passing through transformation unit 308. This bypassing of transformation unit 314 allows for operations such as compilation of code on-the-fly.

The embodiment illustrated in FIG. 3 includes an additional transformation unit 314 and an additional clear path 315 for passing code and/or data between I/O controller 316 and memory 312. This transformation unit is used during DMA transfers to transform data from disk 320 before the data is stored in memory 312. The clear path 315 can be used to transfer executable code from disk 320 into memory 312.

Note that a number of different mechanisms can be used to indicate to the hardware illustrated in FIG. 3 that data is to be transferred over a clear path versus through a transformation unit. One embodiment of the present invention uses separate address ranges to differentiate data to be scrambled from data that is not to be scrambled. For example, instructions 313 can be stored in a different address range than scrambled data 311. Another embodiment of the present invention uses separate addressing modes in a memory management unit (MMU) to differentiate clear data from scrambled data. In yet another embodiment, the present invention uses different instructions in the computer system's instruction set to differentiate transfers through a clear path and transfers through a transformation unit.

Figures 4, 5:
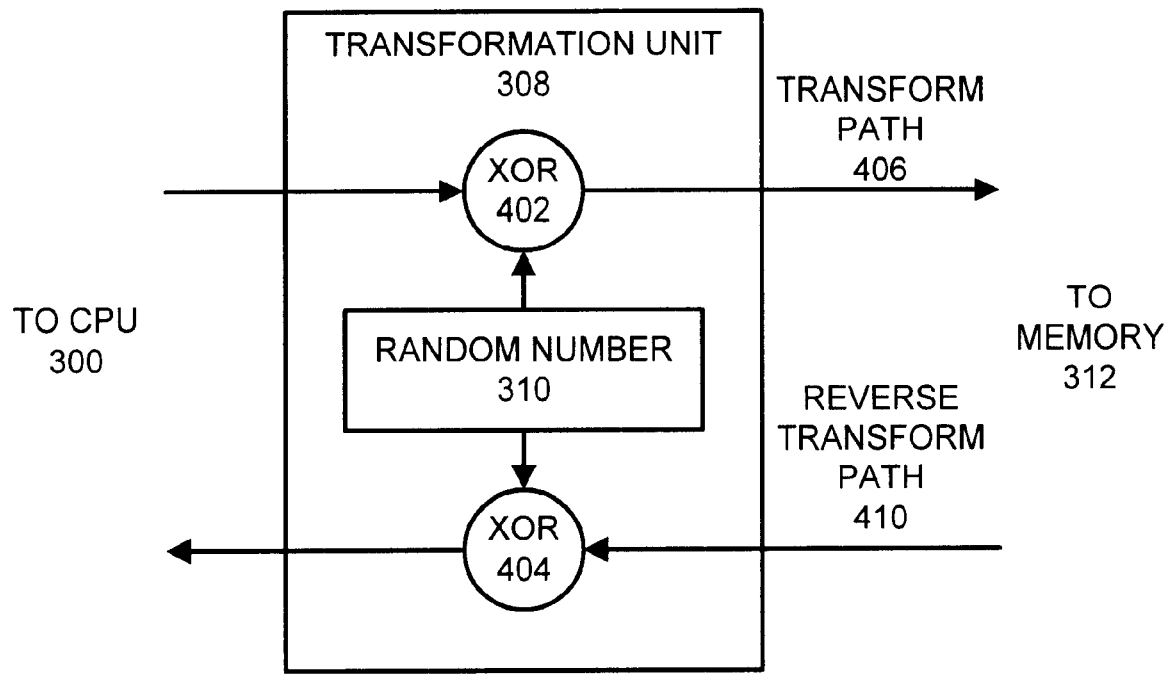
FIG. 4 illustrates the internal structure of a hardware transformation unit in accordant with an embodiment of the present invention.
FIG. 5 illustrates a software implementation of the transformation process in accordance with an embodiment of the present invention.

FIG. 4 illustrates the internal structure of a hardware transformation unit 308 in accordance with an embodiment of the present invention. Data passing through transformation unit 308 either follows a transform path 406, from CPU 300 to memory 312, or a reverse transform path, from memory 312 to CPU 300. In the illustrated embodiment, random number 310 is applied to data in the transform path 406 through exclusive-OR (XOR) circuitry 402. Each word of data passing through transform path 406 is bit-wise exclusive-ORed with random number 310 to produce scrambled data.

In the reverse transformation path 410, each word of data passing through transformation unit 308 is bit-wise exclusive-ORed with random number 310 to restore the data to its original form.

Although a particular implementation of transformation unit 308 is illustrated in FIG. 4, in general the present invention can use any circuitry that performs a reversible function on the data using random number 310.

Software Implementation

FIG. 5 illustrates a software implementation of the transformation process in accordance with an embodiment of the present invention. This software implementation uses macros in the C programming language to perform the transformation. These macros are used to by applications to access data received from an external source. The code illustrated in FIG. 3 presents definitions for the macros "write_c_randomized" and "read_randomized_c" as well as examples of how the macros are used.

The macro "write_C_randomized" causes a character "c" to be bit-wise exclusive-ORed with a specific byte within the random number "rand." This byte is chosen based upon the last two bits of the pointer "ptr." Finally, the resulting value is written to the location pointer to by the pointer "ptr."

Conversely, the macro "read_randomized_c" retrieves a value pointed to by the pointer "ptr," and causes the value to be to be bit-wise exclusive-ORed with the same byte within the random number "rand."

Note that these macros can be selectively applied by a programmer to untrusted data originating from external source. For efficiency reasons, these macros are not applied to other types of "trusted" data, such as locally defined loop variables.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for limiting security attacks on a computer system that operate by causing the computer system to execute computer instructions embedded in data received from an external source, comprising:
   receiving the data from the external source, wherein the data includes email messages, web pages, and data files;
   performing a transformation on the data that causes computer instructions that may be encoded in the data to be unexecutable;
   after the data is transformed, storing the data in a memory in the computer system;
   retrieving the data from the memory in the computer system; and
   reversing the transformation on the data.

2. The method of claim 1, wherein the act of performing the transformation involves using a function that transforms the data based upon a random number.

3. The method of claim 2, further comprising generating the random number in the computer system.

4. The method of claim 2, further comprising receiving the random number from a computer system user.

5. The method of claim 1, wherein the act of performing the transformation involves inserting a special bit pattern at regular intervals in the data so that every word in the data becomes an illegal instruction.

6. The method of claim 1, wherein the act of receiving the data from the external source includes receiving the data across a computer network.

7. The method of claim 1, wherein the act of receiving the data from the external source includes receiving the data from a secondary storage device in the computer system.

8. The method of claim 1, further comprising after the data is transformed, storing the data to a secondary storage device in the computer system.

9. The method of claim 8, wherein the act of storing the data to the secondary storage device includes storing the data along with information on how to reverse the transformation.

10. The method of claim 1, further comprising storing the data to a secondary storage device in the computer system before the data is transformed.

11. The method of claim 1, wherein the act of transforming the data involves using special-purpose circuitry in the computer system to transform the data.

12. The method of claim 1, wherein the act of transforming the data involves transforming using computer instructions to transform the data.

13. The method of claim 1, wherein the transformation is applied to untrusted data from the external source, and further comprising storing trusted data items into the memory without transformation.

14. A method for limiting security attacks on a computer system that operate by causing the computer system to execute computer instructions embedded in data received from an external source, comprising:
   generating a random number;
   receiving the data from the external source across a computer network, wherein the data includes email messages, web pages, and data files;
   performing a transformation on the data based upon the random number that causes computer instructions that may be encoded in the data to be unexecutable;
   after the data is transformed, storing the data in a memory in the computer system;
   retrieving the data from the memory in the computer system; and
   reversing the transformation on the data using the random number.

15. A computer readable storage medium storing instructions that when executed by a computer cause the computer to perform a method for limiting security attacks on a computer system that operate by causing the computer system to execute computer instructions embedded in data received from an external source, comprising:
   receiving the data from the external source, wherein the data includes email messages, web pages, and data files;
   performing a transformation on the data that causes computer instructions that may be encoded in the data to be unexecutable;
   after the data is transformed, storing the data in a memory in the computer system;
   retrieving the data from the memory in the computer system; and
   reversing the transformation on the data.

16. An apparatus that limits security attacks on a computer system that operate by causing the computer system to execute computer instructions embedded in data received from an external source, the apparatus comprising:

a receiving mechanism that receives the data from the external source, wherein the data includes email messages, web pages, and data files;

a transformation mechanism that performs a transformation on the data that causes any computer instructions that may be encoded in the data to be unexecutable before the data is stored in a memory in the computer system; and a transformation reversal mechanism that reverses the transformation on the data after the data is retrieved from the memory in the computer system.

17. The apparatus of claim 16, wherein the transformation mechanism is configured to transform the data based upon a random number.

18. The apparatus of claim 17, further comprising a mechanism that generates the random number.

19. The apparatus of claim 16, wherein the transformation mechanism includes special-purpose circuitry to transform the data.

20. The apparatus of claim 16, wherein the transformation mechanism includes computer instructions to transform the data.

21. A computer system that limits security attacks that operate by causing the computer system to execute computer instructions embedded in data received from an external source, comprising:

an execution unit, for executing computer instructions;

a memory;

a receiving mechanism that receives the data from the external source, wherein the data includes email messages, web pages, and data files;

a transformation mechanism that performs a transformation on the data that causes any computer instructions that may be encoded in the data to be unexecutable before the data is stored in the memory; and a transformation reversal mechanism that reverses the transformation on the data after the data is retrieved from the memory.

22. The computer system of claim 21, further comprising a secondary storage device.

23. The computer system of claim 22, wherein the receiving mechanism is configured to receive the data from the secondary storage device.

24. The computer system of claim 22, further comprising a storage mechanism that is configured to store the data to the secondary storage device after the data is transformed.

25. The computer system of claim 24, wherein the storage mechanism is configured to store the data along with information on how to reverse the transformation to the data.

26. The computer system of claim 22, further comprising a storage mechanism that is configured to store the data to the secondary storage device before the data is transformed.

27. The computer system of claim 21, wherein the transformation mechanism is configured to transform the data based upon a random number.

28. The computer system of claim 21, further comprising a mechanism that generates the random number.

29. The computer system of claim 21, further comprising a mechanism that receives the random number from a computer system user.

30. The computer system of claim 21, wherein the transformation mechanism is configured to insert a special bit pattern at regular intervals in the data so that every word in the data becomes an illegal instruction.

31. The computer system of claim 21, wherein the receiving mechanism is configured to receive the data from across a computer network.

32. The computer system of claim 21, wherein the transformation mechanism includes special-purpose circuitry to transform the data.

33. The computer system of claim 32, wherein the transformation mechanism is located on a data path between the memory and the execution unit that is separate from an instruction path between the memory and the execution unit.

34. The computer system of claim 33, wherein the data path between the memory and the execution unit additionally includes an alternate path that bypasses the transformation mechanism.

35. The computer system of claim 33, further comprising:

a direct memory access (DMA) controller; and a second transformation mechanism coupled between the DMA controller and the memory that transforms data from the DMA controller before the data is stored in the memory.

36. The computer system of claim 21, wherein the transformation mechanism includes computer instructions to transform the data.

37. The computer system of claim 21, wherein the transformation mechanism is configured to operate on untrusted data from the external source, and is configured not to operate on other types of data.

* * * * *